United States Patent
Boersma et al.

[11] Patent Number: 6,149,526
[45] Date of Patent: Nov. 21, 2000

[54] VARIABLE LENGTH STEERING SHAFT FOR STEERING MECHANISMS OF MOTOR VEHICLES

[75] Inventors: Josef Sape Boersma, Bludesch, Austria; Herbert Müntener, Ruggell, Liechtenstein

[73] Assignee: Etablissement Supervis, Vaduz, Liechtenstein

[21] Appl. No.: 09/189,089

[22] Filed: Nov. 9, 1998

[30] Foreign Application Priority Data

Nov. 12, 1997 [DE] Germany ............................ 197 50 005

[51] Int. Cl.⁷ ...................................................... B62D 1/18
[52] U.S. Cl. ............................ 464/89; 403/225; 403/359; 464/162; 74/493; 74/586
[58] Field of Search ................................. 464/73, 74, 75, 464/87, 88, 150, 149, 153, 154, 162, 173, 89, 901; 405/359.2, 225; 74/493, 492

[56] References Cited

U.S. PATENT DOCUMENTS

| | | | |
|---|---|---|---|
| 2,199,926 | 5/1940 | Swennes | 464/89 |
| 4,020,651 | 5/1977 | Callies | 464/162 |
| 4,033,020 | 7/1977 | Hudgens | 464/89 |
| 4,667,530 | 5/1987 | Mettler et al. | 464/89 |
| 5,460,574 | 10/1995 | Hobaugh | 464/89 |
| 5,507,203 | 4/1996 | Audibert et al. | 464/162 |
| 5,902,186 | 5/1999 | Gaukel | 464/89 |
| 5,919,094 | 7/1999 | Yaegashi | 464/162 |

*Primary Examiner*—Lynne H. Browne
*Assistant Examiner*—Kenneth Thompson
*Attorney, Agent, or Firm*—Brown & Wood, LLP

[57] ABSTRACT

A variable length steering shaft for steering mechanism of motor vehicles and including an external profile tubular member having a non-circular cross-section, an internal profile member arranged coaxially with the external profile member and having its end portion received in the external profile tubular member, the internal profile member being axially displaceable within the external tubular member, and a slide sleeve formed of a macromolecular material and arranged in the gap formed by the external and internal profile members for formlockingly connecting the external and internal profile members for transmitting a torque therebetween, with an outer circumferential contour of the internal profile member and the inner circumferential contour of the external profile tubular member being at least partially formed each of a plurality of following each other convex and concave sections with radii of the convex and concave sections being respectively located inside and outside of a respective profile member, and with the slide sleeve having surface portions alternatively engaging the convex sections of the internal profile member and the concave sections of the external profile member.

7 Claims, 3 Drawing Sheets

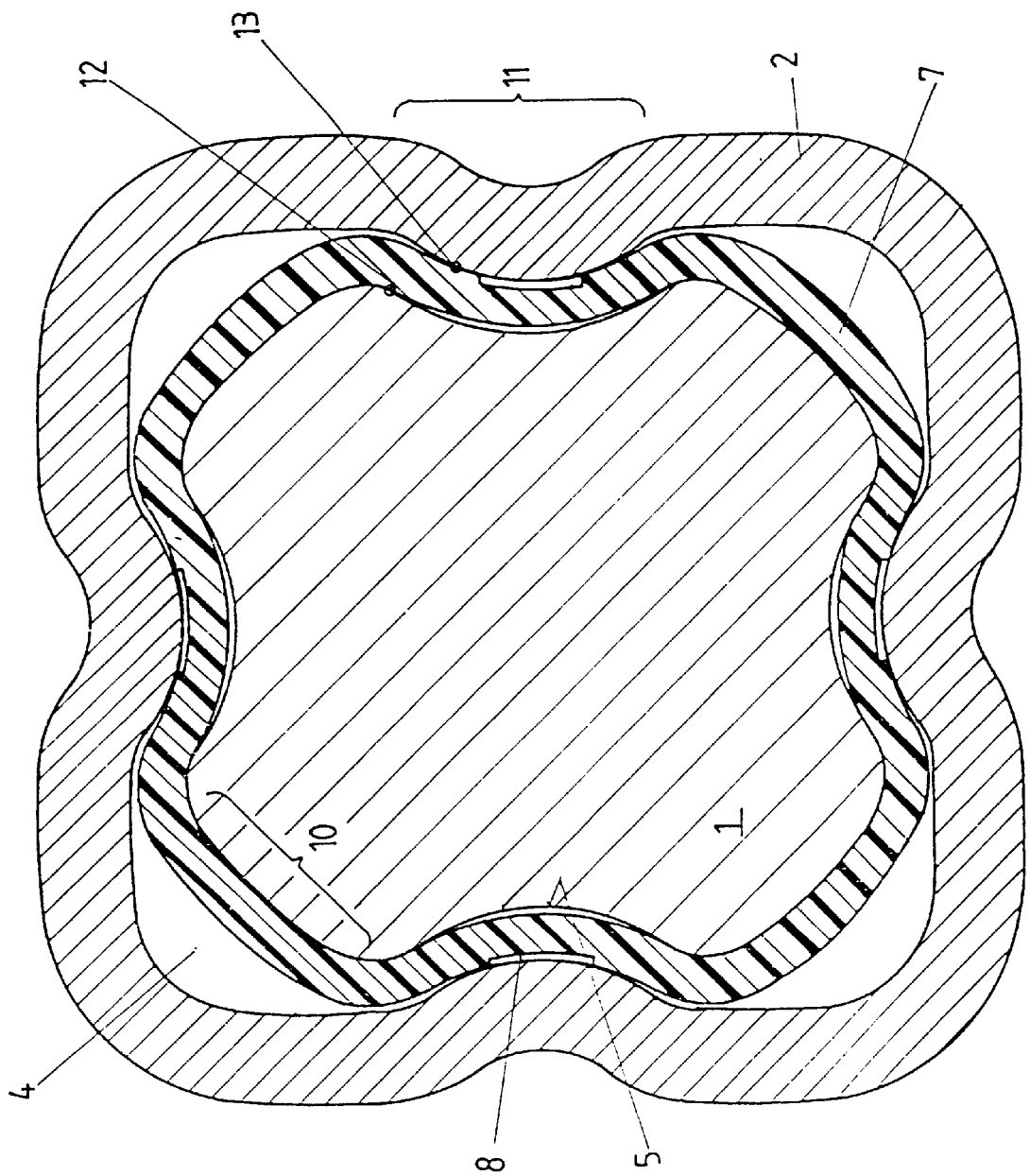

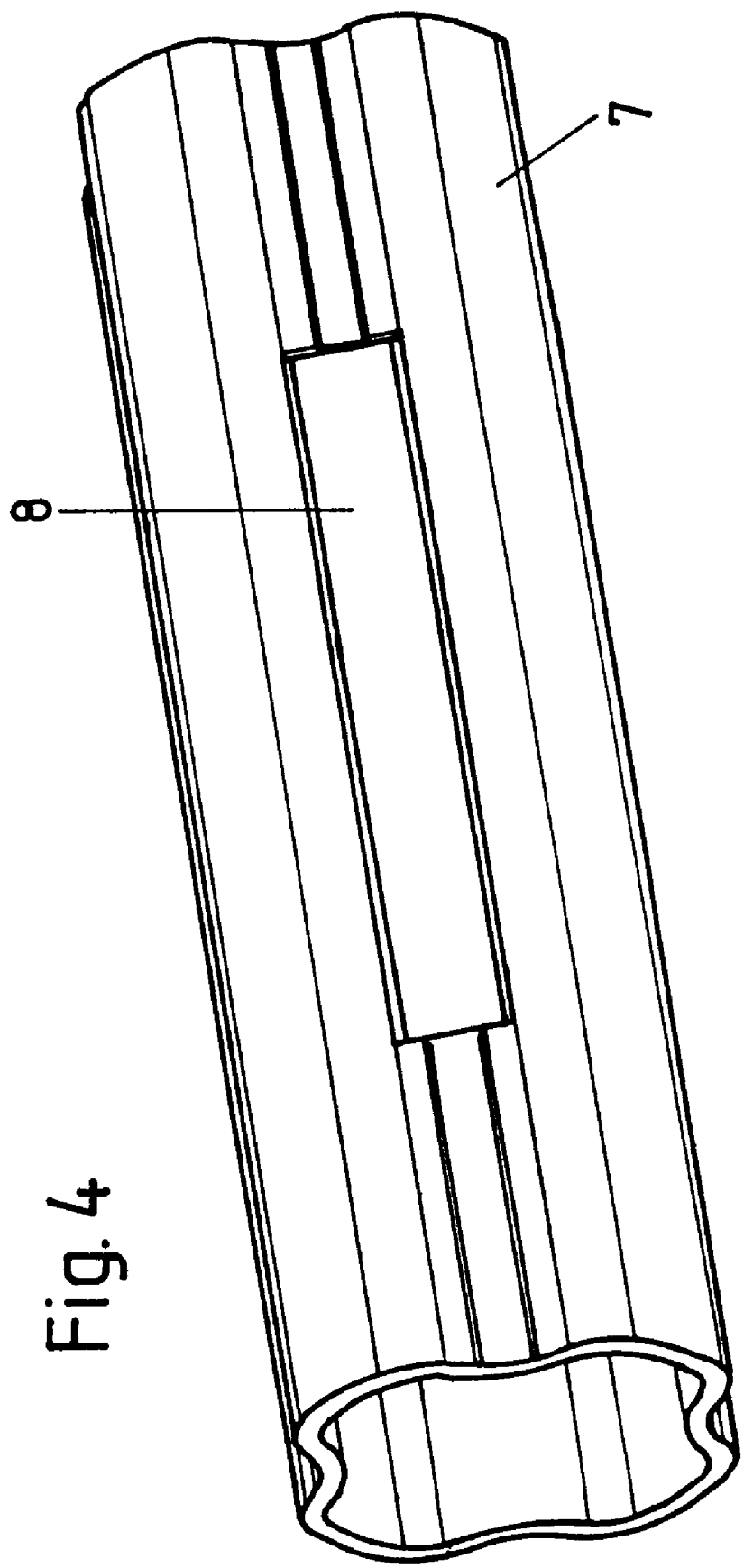

VARIABLE LENGTH STEERING SHAFT FOR STEERING MECHANISMS OF MOTOR VEHICLES

BACKGROUND OF THE INVENTION

1. Field of the Invention

The present invention relates to a variable length steering shaft for steering mechanisms of motor vehicles including an external profile tubular member having a noncircular cross-section, an internal profile member arranged coaxially with the external profile tubular member and having its end portion received in the external profile tubular member, with the internal profile member being axially displaceable within the external tubular member and forming with the external profile tubular member a circumferential gap having a variable width, and a slide sleeve formed of a macromolecular material and arranged in the gap formed by the external and internal profile members for formlockingly connecting the external and internal profile members for transmitting a torque therebetween, with the internal profile member having an outer circumferential contour which at least sectionwise approximately corresponds to an inner circumferential contour of the external profile tubular member, and with the outer circumferential contour of the internal profile member and the inner circumferential contour of the external profile tubular member being at least partially formed each of a plurality of following each other convex and concave sections with radius of the convex and concave sections being respectively located inside and outside of a respective profile member.

2. Description of the Prior Art

Steering shafts of the above-described type are disclosed, e.g., in U.S. Pat. Nos. 2,772,104 and 2,272,900, British Patents Nos. 1,530,971 and 1,542,127, German Patents Nos. 2,925,398 and 3,624,473 and German Publication DE-05 1530971. Thus, German Patent No. 3,624,473 discloses a variable length steering shaft in which the slide sleeve, which is located between the two profile members, has longitudinally extending rib-shaped strips arranged on the side of the sleeve located opposite the profile member slidable relative to the sleeve. The strips protrude into the space between the two profile members. The strips engage the wall of the relatively slidable profile member and become deformed upon engaging the wall. Between a pair of strips, an insert of a permanently elastic material is arranged. As a rule, the insert is formed of a rubber cord or a resilient strip. The known construction permits to compensate the backlash between the two profile members. However, the static friction between the two profile members is so large that the parameters which define the relative axial displacement of the two profile members cannot be maintained.

Accordingly, an object of the present invention is to provide means for compensating the backlash necessarily formed between the two profile members, without changing the parameters defining the gap between the two profile member.

SUMMARY OF THE INVENTION

This and other objects of the present invention, which will become apparent hereinafter, are achieved by providing a slide sleeve having outer and inner circumferential surface portions engageable with respective walls of the external and internal profile members alternatively and only sectionwise, with respective surface portions alternatively engaging the convex sections of the internal profile member and the concave sections of the external profile member.

Advantageously, according to the present invention, respective outer and inner circumferential portions have respective radially adjacent transition zones which, with the steering shaft being in a torque-free condition, are angularly offset between an engagement of the slide sleeve with a respective profile member and a following gap formed between the slide sleeve and the respective profile member. At that, a section of the slide sleeve located between the respective radially adjacent transition zones has, when viewed in a circumferential direction, is spaced form the profile members.

BRIEF DESCRIPTION OF THE DRAWINGS

The features and objects of the present invention will become more apparent, and the invention itself will be best understood from the following detailed description for the preferred embodiment when read with reference to the accompanying drawings, wherein:

FIG. 3. is a cross-sectional view taken along line III—III in FIG. 2 at an enlarged scale; and FIG. 4 is a perspective view of a slide sleeve forming part of the steering shaft according to the present invention.

DETAILED DESCRIPTION OF THE PREFERRED EMBODIMENT

Figure 1:
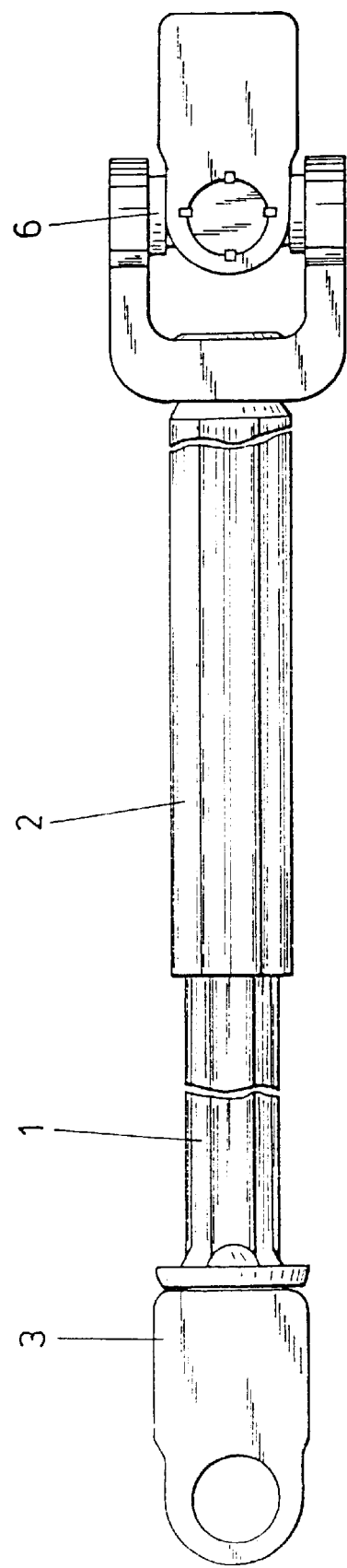
FIG. 1 is a front view of a steering shaft according to the present invention.
Figure 2:
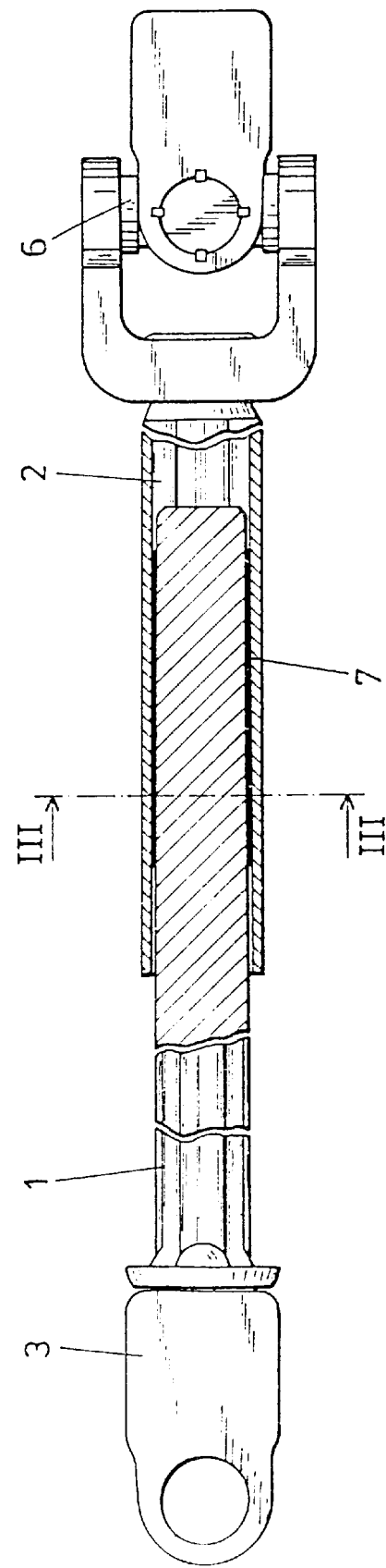
FIG. 2 is a cross-sectional view of the steering shaft shown in FIG. 1.

A steering shaft according to the present invention and shown in FIGS. 1 through 3 includes a first profile member 1 having a solid cross-section and carrying, at one of its opposite ends, a shaped part 3 to which further components of a steering assembly, which do not form part of the present invention and which are not shown in the drawings, are to be attached. The profile member 1, which is formed as a profile bar the cross-section of which is shown in FIG. 3, can be produced by rolling, cold pressing or cold drawing from a solid material.

The cross-section of the profile member 1 is formed with rounded corner areas between which press-in grooves are formed. Between the corner areas and the respective pressed-in groove, the profile member has continuous curved transition areas.

The steering shaft further includes a second profile member 2 which is formed as a tubular part and carries at its end, which is opposite to the end of the first profile member 1 carrying the shaped part 3, a hinge part 6. The tubular profile member 2 has a cross-section which approximately matches the cross-section of the profile member 1. The cross-section of the profile member 2 likewise has rounded corner areas with pressed-in grooves therebetween. As in the profile member 1, continuous curved transitional areas are provided between the corner areas and the pressed-in grooves in the profile member 2.

The cross-sectional configuration or the circumferential contour of each of the profile members 1 and 2 is formed by following one another curved sections, namely, convex and concave sections. The radii of curvature of the curved sections of respective circumferential contours are alternatively positioned inside and outside of the respective profile members 1 and 2. Moreover, the individual radii of curvature of each circumferential contour differ in size, as can be seen in FIG. 3.

The inside dimensions of the external profile member 2 and the outside dimensions of the internal profile member 1 differ to such an extent that a noticeable clearance is formed between them. The clearance between the two profile members 1 and 2 defines a circumferential gap having a variable width along its circumference. To bridge this circumferential gap and to provide for sliding of the two profile members 1 and 2 relative to each other, a slide sleeve 7, which is formed of a suitable macromolecular or plastic material having a low friction coefficient is secured on the internal profile member 1, as shown in FIG. 3. The circumferential contour of the sliding sleeve 7 substantially corresponds to the circumferential contour of the profile member 1. In its mounted condition on the profile member 1, the slide sleeve 7 has a circumferential contour which slightly deviates from the contour the slide sleeve 7 has in its non-mounted condition. As a result of this, the slide sleeve 7 becomes slightly deformed upon being mounted on the profile member 1, and is prestressed in its mounted condition. The slide sleeve 7 has substantially the same wall thickness along its entire circumference. Several such slide sleeves 7 can be arrange along the length of the steering shaft. Generally, two slide sleeves 7 spaced from each other are provided on the internal profile member 1.

For the slide sleeve 7, it is only essential that it fits closely in the peripheral contours of the two profile members 1 and, alternatively against convex sections 10 of the internal profile member 1 and against concave sections 11 of the external profile part 2. The slide sleeve 7 extends along the concave sections of the profile member 1 with a clearance. Transition zones 12 and 13 are formed at both the internal profile member 1 and the external profile member 2. The transition zones 12 and 13 define tangentional areas in which the slide sleeve 7 extends with respect to the profile members 1 and 2 with a clearance before abutting the profile members 1 and 2. The clearance has a shape of a narrow curved wedge. With a torque-free steering shaft (please see FIG. 3), the transition zones 12, 13 are located adjacent to each other radially and are angularly offset relative to each other in intermediate positions of the slide sleeve 7 with respect to the profile members 1 and 2. Viewed in the circumferential direction, the section of the slide sleeve 7 located between the transition zones 12 and 13 extends with a clearance relative to adjacent sections of the profile members 1 and 2. The angular offset of the transition zones 12 and 13, which are located radially adjacent to each other, is approximately 10°. In the regions, where the slide sleeve 7 lies against the concave sections of the external profile member 2, elongate grooves 8 are formed in the slide sleeve 7. The regions of the slide sleeve, which are located on opposite sides of the groove 8, have a surface contact with the external profile member 2, as shown in FIG. 3.

The elongate grooves 8 can have different dimensions over the length of the slide sleeve 7. The dimensions of the groove 8, in the middle region of the longitudinal extent of the slide sleeve 7, are greater than the dimensions of groove sections located adjacent to the end sections of the slide sleeve 7. Because of manufacturing requirements the profile members 1 and 2 and/or their surfaces have certain dimensional tolerances. Thanks to the above-discussed dimensioning of the grooves 8, only very small frictional forces are generated during a longitudinal adjustment of the steering column. The reduction of the wall thickness of the slide sleeve 7 due to the foregoing groove dimensioning results in a greater resiliency of the slide sleeve 7 in the area in which it acts as a compensating sleeve.

Due to the foregoing measures, the contact areas between the inner and outer profile members 1 and 2 and the slide sleeve 7 are reduced in comparison with similar designs of the prior art. As a result of this reduction, more favorable condition are created for sliding of the two profile members relative to each other. In addition, the sections of the slide sleeve 7, which are located between the transition zones 12, 13, acts like leaf springs, whereby turning of the steering wheels is associated with a certain, practically backlash-free, steering resistance. As a result, the driver, which operates the steering wheel, does not feel the backlash necessarily existing due to constructional imperfection.

The essence of the present invention consists in that the transition zones 12, 13 are located adjacent to each other in the radial direction and are angularly offset relative to each other in the intermediate positions of the slide sleeve 7 between the positions of the slide sleeve 7, in which it lies closely to or abuts the respective sections of the profile members 1 and 2, and positions in which it extends with a clearance relative to the profile members 1, 2. As a result of this angular offset, the sections of the slide sleeve 7, which are located between respective radially adjacent transition zones 12 and 13, extend freely in the clearance space 4 and act like a spring upon application of a torque to the steering column.

Though the present invention was shown and described with reference to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A variable length steering shaft for steering mechanisms of motor vehicles, comprising:

an external profile tubular member having a non-circular cross-section;

an internal profile member arranged coaxially with the external profile member and having an end portion thereof received in the external profile tubular member, the internal profile member being axially displaceable within the external tubular member and forming with the external profile tubular member a circumferential gap having a variable width; and a slide sleeve formed of a macromolecular material and arranged in the gap formed by the external and internal profile members for form lockingly connecting the external and internal profile members for transmitting a torque therebetween, wherein the internal profile member has an outer circumferential contour which at least sectionwise approximately corresponds to an inner circumferential contour of the external profile tubular member, wherein the outer circumferential contour of the internal profile member and the inner circumferential contour of the external profile tubular member are at least partially formed each of a plurality of following each other convex and concave sections with radii of the convex and concave sections being respectively located inside and outside of a respective profile member, wherein the slide sleeve has outer and inner circumferential surface portions engageable with respective walls of the external and internal profile members alternatively and only sectionwise, with respective surface portions alternatively engaging the convex sections of the internal profile member, and wherein regions of the slide sleeve engaging the concave section of the external profile member have each an elongate groove formed therein which provides for a surface contact of respective engaging regions of the slide sleeve with the concave section of the external profile member.

2. A variable length steering shaft as set forth in claim 1, wherein respective outer and inner circumferential portions comprise respective radially adjacent transition zones which, with the steering shaft being in a torque-free condition, are angularly offset between an engagement of the slide sleeve with a respective profile member and a following gap formed between the slide sleeve and the respective profile member, and wherein a section of the slide sleeve located between the respective radially adjacent transition zones, when viewed in a circumferential direction, is spaced from the profile members.

3. A variable length steering shaft as set forth in claim 1, wherein the slide sleeve has a wall having a substantially uniform thickness along a circumference thereof.

4. A variable length steering shaft as set forth in claim 2, wherein the transition zones are angularly offset by about 10°.

5. A variable length steering shaft as set forth in claim 1, comprising a plurality of slide sleeves arranged along a length thereof.

6. A variable length steering shaft as set forth in claim 5, wherein the slide sleeves are spaced from each other.

7. A variable length steering shaft for steering mechanisms of motor vehicles, comprising:

an external profile tubular member having a non-circular cross-section;

an internal profile member arranged coaxially with the external profile member and having an end portion thereof received in the external profile tubular member, the internal profile member being axially displaceable within the external tubular member and forming with the external profile tubular member a circumferential gap having a variable width; and a slide sleeve formed of a macromolecular material and arranged in the gap formed by the external and internal profile members for form lockingly connecting the external and internal profile members for transmitting a torque there between, wherein the internal profile member has an outer circumferential contour which at least sectionwise approximately corresponds to an inner circumferential contour of the external profile tubular member, wherein the outer circumferential contour of the internal profile member and the inner circumferential contour of the external profile tubular member are at least partially formed each of a plurality of following each other convex and concave sections with radii of the convex and concave sections being respectively located inside and outside of a respective profile member, wherein the slide sleeve has outer and inner circumferential surface portions engageable with respective walls of the external and internal profile members alternatively and only sectionwise, with respective surface portions alternatively engaging the convex sections of the internal profile member and the concave sections of the external profile member, wherein regions of the slide sleeve engageable with the concave section of the external profile member have each an elongate groove formed therein; and wherein the groove has different dimensions along a longitudinal extent thereof.

* * * * *